United States Patent
Govyadinov et al.

(10) Patent No.: US 10,655,994 B2
(45) Date of Patent: May 19, 2020

(54) MICROFLUIDIC FLOW SENSOR

(71) Applicant: HEWLETT-PACKARD DEVELOPMENT COMPANY, L.P., Houston, TX (US)

(72) Inventors: Alexander Govyadinov, Corvallis, OR (US); Erik D Torniainen, Corvallis, OR (US); Pavel Kornilovich, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 128 days.

(21) Appl. No.: 15/546,327

(22) PCT Filed: Apr. 30, 2015

(86) PCT No.: PCT/US2015/028577
§ 371 (c)(1),
(2) Date: Jul. 26, 2017

(87) PCT Pub. No.: WO2016/175843
PCT Pub. Date: Nov. 3, 2016

(65) Prior Publication Data
US 2018/0023987 A1 Jan. 25, 2018

(51) Int. Cl.
*G01F 1/684* (2006.01)
*B41J 2/125* (2006.01)
(Continued)

(52) U.S. Cl.
CPC ...... *G01F 1/6845* (2013.01); *B01L 3/502746* (2013.01); *B41J 2/125* (2013.01);
(Continued)

(58) Field of Classification Search
CPC ........ G01F 1/6845; G01F 1/6986; G01F 1/69; B41J 2/175; B41J 2/125; B01L 3/502746;
(Continued)

(56) References Cited

U.S. PATENT DOCUMENTS 4,616,505 A 10/1986 Jouwsama
4,680,963 A * 7/1987 Tabata ...................... G01P 5/12
73/204.18
(Continued)

FOREIGN PATENT DOCUMENTS

WO WO-2005050190 6/2005
WO WO-2014076419 5/2014

OTHER PUBLICATIONS

Foss et al, "The pulse width modulated-constant temperature anemometer", Meas. Sci. Technol. 7, 1388-1395 (Year: 1996).*
(Continued)

*Primary Examiner* — Nathaniel T Woodward
(74) *Attorney, Agent, or Firm* — Rathe Lindenbaum LLP

(57) ABSTRACT

An apparatus includes a microfluidic channel and a flow sensor along the microfluidic channel. The flow sensor includes a heat emitting resistor for connection to an electric current source, analytical parameter sensor and electronics. The heat emitting resistor has a resistance that varies in response to temperature. The electrical parameter sensor is to sense an electrical parameter of the heat emitting resistor that is based on the resistance of the heat emitting resistor. The electronics determine a flow based on the sensed electrical parameter.

21 Claims, 4 Drawing Sheets

(51) Int. Cl.
  *B01L 3/00* (2006.01)
  *G01F 1/69* (2006.01)
  *G01F 1/698* (2006.01)
  *B41J 2/175* (2006.01)

(52) U.S. Cl.
  CPC ............. *B41J 2/175* (2013.01); *G01F 1/69* (2013.01); *G01F 1/6986* (2013.01); *B01L 2300/0627* (2013.01); *B01L 2300/0887* (2013.01); *B01L 2400/082* (2013.01)

(58) Field of Classification Search
  CPC ....... B01L 2400/082; B01L 2300/0627; B01L 2300/0887
  See application file for complete search history.

(56) References Cited

U.S. PATENT DOCUMENTS

| | | |
|---|---|---|
| 6,032,527 A | 3/2000 | Genova et al. |
| 6,357,293 B1 | 3/2002 | Ando et al. |
| 6,769,298 B2 | 8/2004 | Matsumura et al. |
| 7,059,186 B2 | 6/2006 | Pinter et al. |
| 7,363,810 B2 * | 4/2008 | Ikeda .................... G01F 1/6845 73/204.22 |
| 2004/0089357 A1 * | 5/2004 | Dube ................ B01L 3/502707 137/884 |
| 2005/0044950 A1 * | 3/2005 | Kwon ....................... G01F 1/69 73/204.14 |
| 2009/0173166 A1 | 7/2009 | Genosar |
| 2011/0312736 A1 * | 12/2011 | Silverbrook .......... B01L 3/5027 506/39 |
| 2013/0014577 A1 | 1/2013 | Tam et al. |
| 2013/0041234 A1 | 2/2013 | Grinstein et al. |

OTHER PUBLICATIONS

Kuo et al.; Micromachined Thermal Flow Sensors—A Review; Micromachines; Jul. 23, 2012, pp. 1-24.

* cited by examiner

MICROFLUIDIC FLOW SENSOR

BACKGROUND

Various sensors are available for sensing the flow of fluid. However, such sensors may be bulky, expensive, and very difficult to integrate in chips and microfluidic devices.

DETAILED DESCRIPTION OF EXAMPLES

Figure 1:
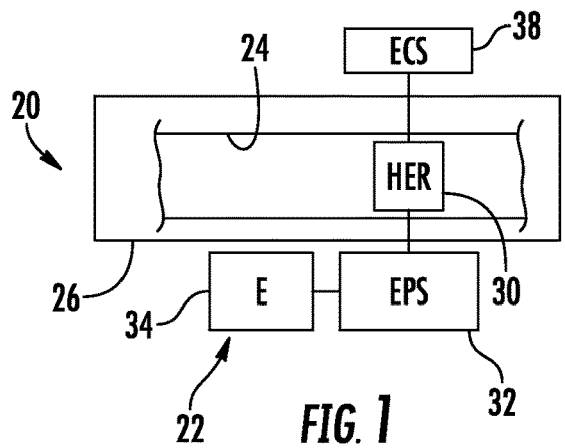
FIG. 1 is a top view schematically illustrating an example microfluidic flow sensing system.

FIG. 1 schematically illustrates an example microfluidic flow sensing system 20 which comprises a microfluidic sensor 22 that senses the flow of fluid through microfluidic channel 24. As will be described hereafter, flow sensor 22 facilitates the sensing of fluid flow in a compact and cost-effective fashion. Flow sensor 22 is well suited for being integrated into microfluidic devices.

Microfluidic channel 24 comprises a passage formed within or upon a substrate 26. Microfluidic channel 24 has a width and height, each of which is in the sub-millimeter scale. In one implementation, microfluidic channel 24 has a width and height, each having a dimension of between 5 and 200 μm and nominally between 5 and 50 μm. Although illustrated as being linear, microfluidic channel 24 may have a curved, serpentine, branched or other shape.

Flow sensor 22 comprises a device integrated into or onto substrate 26 with respect to microfluidic channel 24. For purposes of this disclosure, the term "integrated" with respect to a chip, substrate or microfluidic channel means that a device or component is integral with the chip or substrate or substrate or that the device or component is built into or as part of the chip or substrate in that structures of the device or component are formed or fabricated upon the chip or substrate such that they cannot be readily separated without cutting or severing portions of the chip or substrate. Because flow sensor 22 is integrated with microfluidic channel 24 on substrate 26, a separate connection of flow sensor 22 to microfluidic channel 24 may be avoided. Flow sensor 22 comprises heat emitting resistor 30, electrical parameter sensor 32 and electronics 34.

Heat emitting resistor 30 comprises a structure comprises a material or materials that have an electrical resistance such that heat is produced and emitted by the structure as electric current passes through the structure. The electrical resistance of heat emitting resistor 30 varies in response to temperature. As shown by FIG. 1, heat emitting resistor 30 is located within microfluidic channel 24 and is to be connected to an electrical current source 38 which supplies electrical current to and circulates electrical current across heat emitting resistor 30. In one implementation, electrical current source 38 supplies a direct-current (DC) to heat emitting resistor 30. In one implementation, electrical current source 38 supplies time-space pulses of direct-current to heat emitting resistor 30. In another implementation, electrical current source 38 supplies short pulses of alternating current (AC) to heat emitting resistor. The use of pulses of AC or DC current may reduce power consumption and sensor thermal impact while increasing sensitivity, noise resistance and a signal-to-noise ratio.

As liquid or fluid flows across heat emitting resistor 30 and as electrical current is passed through heat emitting resistor 30, the heat generated by heat emitting resistor is carried away by the fluid flow. The greater the fluid flow, the greater the rate at which the heat will be carried away from heat emitting resistor 30. The specific rate may depend upon fluid properties as well, such as density, conductivity and heat capacity. The greater the rate at which heat is carried away from heat emitting resistor 30, the lower the temperature of heat emitting resistor 30. This lower temperature may in turn impact the electric resistance of heat emitting resistor 30, further impacting the rate at which electrical current passes through heat emitting resistor 30. As a result, heat emitting resistor 30 provides a single structure that may be integrated into microfluidic channel 24, that produces heat and that exhibits a varying electrical resistance in response to the rate at which the produced heat is carried away by fluid flow.

Electrical parameter sensor 32 comprises electrical componentry electrically connected or electrically coupled to heat emitting resistor 30 so as to sense an electrical parameter of heat emitting resistor 30 that is based on the resistance of the heat emitting resistor 30. In one implementation, the parameter may comprise a voltage across heat emitting resistor 30. In another implementation, the electrical parameter may comprise electrical current flow across heat emitting resistor 30. Examples of sensor 32 include, but are not limited to, a field effect transistor, a thermocouple, a bipolar junction transistor, or other P-N junction sensing devices. Electrical parameter sensor 32 outputs electrical signals based upon the sensed electrical parameter. Such electrical signals are used by electronics 34 to determine or estimate fluid flow within microfluidic channel 24 across heat emitting resistor 30.

Electronics 34 comprises a device that receives signals from electrical parameter sensor 32 and utilizes such signals (either in a raw format or after such signals have been filtered, converted or processed by electronics 34) to determine or estimate fluid flow within microfluidic channel 24 across heat emitting resistor 30. In one implementation, the determined or estimated fluid flow is additionally based upon retrieved, sensed or programmed default characteristics of the fluid such as its density, conductivity and heat capacity. In one implementation, the electrical signals are converted by an analog to digital converter, wherein electronics 34 comprises a processing unit that receives and utilizes digital signals. In another implementation, electronics 34 estimate fluid flow based upon analog signals.

For purposes of this application, the term "processing unit" shall mean a presently developed or future developed processing unit that comprises hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other implementations, hard wired circuitry may be used in place of or in combination with software instructions to implement the functions described. For example, electronics 34 may be provided as part of application-specific integrated circuits (ASICs). Unless otherwise specifically noted, electronics 34 is not limited to any specific combination of hardware circuitry and software, nor to any particular source for the instructions executed by the processing unit.

In one implementation, the electronics comprises a memory storing a predetermined lookup table that correlates different electrical parameter signals from sensor 32 to different fluid flow rates. In such an implementation, the processing unit estimates of fluid flow rate by comparing the electrical parameter signals from sensor 32 to the different values in the lookup table. In another implementation, electronics 34 utilizes values based upon the different electrical parameter signals as part of a formula to calculate or estimate the fluid flow rate. Upon estimating the current fluid flow rate within microfluidic channel 24 across heat emitting resistor 30, electronics 34 outputs signals indicating the estimated fluid flow rate.

In one implementation, flow sensor 22 is entirely contained or integrated upon substrate 26 or the circuit chip containing microfluidic channel 24. For example, in one implementation, electrical parameter sensor 32 and electronics 34 are each integrated as part of the chip or substrate 26 in or on which microfluidic channel 24 is provided. In one implementation, electrical current source 38 is further integrated onto the chip or substrate 26, wherein electrical current source 20 comprises an electrical contact pad for electrical connection to a power supply. In yet other implementations, portions of flow sensor 22 are distributed among separate substrates or devices. For example, in one implementation, one or both of electrical parameter sensor 32 and electronics 34 are provided by a separate device that is electrically connected to heat emitting resistor 30 upon substrate 26.

Figure 2:
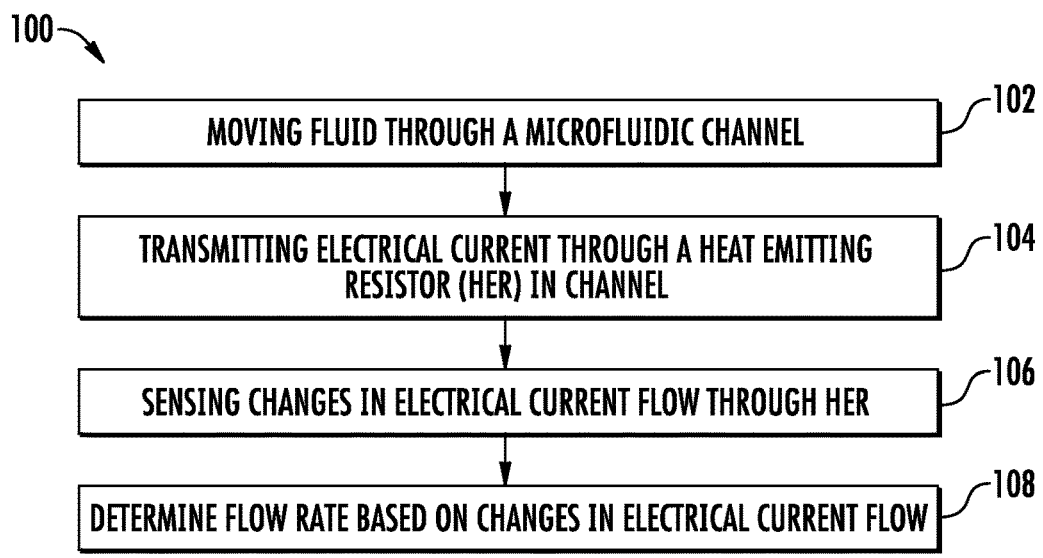
FIG. 2 is a flow diagram of an example method for sensing fluid flow in a microfluidic channel.
Figure 3:
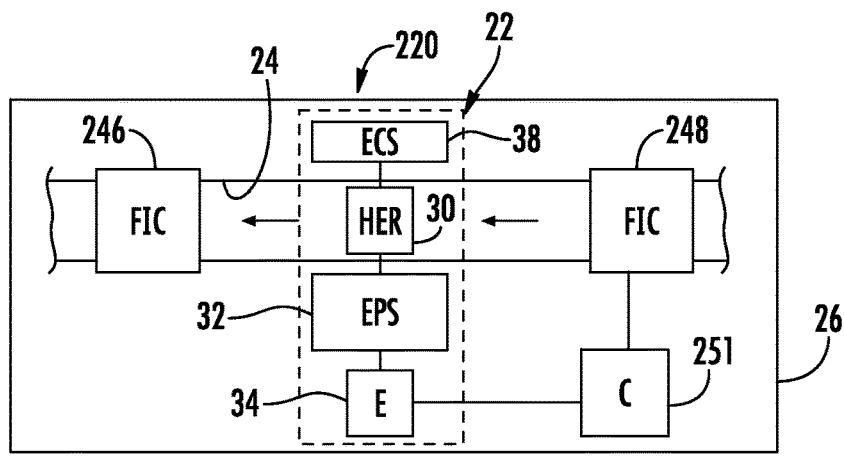
FIG. 3 is a top view schematically illustrating another example microfluidic flow sensing system.

FIG. 2 is a flow diagram of an example method 100 for sensing or detecting the flow of fluid within microfluidic channel. In one implementation, method 100 is carried out by system 20 described above. As indicated by block 102, fluid is moved through a microfluidic channel, such as microfluidic channel 24. As indicated by block 104, as the fluid passes through microfluidic channel 24, electrical current source 38 transmits electrical current through heat emitting resistor 30 which is located within channel 24. As indicated by block 106, electrical parameter sensor 32 senses changes in electrical current flow through the heat emitting resistor 30. The changes in electrical current may be sensed as either a change in a voltage across heat emitting resistor 30 or as a change in the rate of electrical flow or amperage across heat emitting resistor 30. As indicated by block 108, electronics 34 determines or estimates the rate at which fluid is passing through microfluidic channel 24 across heat emitting resistor 30 based upon the sensed changes in electrical current flow (or changes in resistance) from block 106. In one implementation, electronics 34 are pre-calibrated. In particular, the changes in resistance undergone by emitting resistor 30 in response to changes in temperature of the adjacent or surrounding fluid within channel 24 is impacted by fluid thermal conductivity and fluid temperature. As a result, in some circumstances, it may be difficult to calibrate electronics during manufacture. In some implementations, electronics 34 are calibrated in the field using fluids similar to those fluids that will be circulated through channel 24 and at similar temperatures. Such calibration may be performed by determining and storing a relationship between a predetermined fluid flow rate and particular signals output by electrical parameter sensor 32 in response to changes in the electric resistance of emitting resistor 30 or the electrical current passing through heat emitting resistor 30. In some implementations, calibration is carried out on the substrate or chip itself an isolated region designed specifically for calibration purposes. FIG. 3 schematically illustrates microfluidic flow sensing system 220, another example of microfluidic flow sensing system 20. Microfluidic flow sensing system 220 is similar to microfluidic flow sensing system 20 except that system to 20 is additionally illustrated as further comprising fluid interaction components 246 and 248. In the example illustrated, fluid interaction components 246, 248 are integrated upon the same chipper substrate 26 as flow sensor 22. Because flow sensor 22 utilizes a single structure that both emits heat and which has a parameter (electrical resistivity) that changes in response to the fluid flow carrying away the emitted heat, flow sensor 22 is extremely compact, facilitating the integration of flow sensor 22 along with fluid interaction components 246, 248 upon the same chip or substrate 26 providing microfluidic channel 24.

Fluid interaction components 246, 248, schematically illustrated, comprise components integrated into or upon substrate 26 that interact with fluid flowing through microfluidic channel 24. Examples of fluid interaction components 246, 248 integrated upon the chip or substrate 26 include, but are not limited to, a microfluidic branch channel stemming from microfluidic channel 24, and microfluidic pump, such as an inertial pump, a piezo resistive fluid pump, a microfluidic valve, a microfluidic multi-mixer, and a drop ejector, such as a thermal inkjet resistor or piezo resistive diaphragm opposite a nozzle. Although sensor 22 is illustrated as being sandwiched between fluid interaction components 246, 248, in other implementations, fluid flow sensor 22 may be upstream or downstream of a single or multiple fluid interaction components 246, 248. In some implementations, system 220 may comprise a single fluid interaction component 246 or 248 or more than two fluid interaction components.

An inertial pump comprises a pumping device located along channel 24 proximate to a reservoir and distant to a different reservoir or fluid interaction component. In other words, the inertial pump is spaced from the reservoir by a distance less than one half of the length of the total fluid path between the reservoir and the other reservoir or fluid interaction component. Inertial pump utilizes inertia and momentum within a channel that is relatively narrow compared to the two reservoirs it connects to produce fluid flow. For purposes of this disclosure, the term "inertial pump" refers to a pumping device that initially drives fluid in both directions within a channel that is relatively narrow to the reservoirs it connects, but wherein the pumping device is asymmetrically positioned between the reservoirs such that the end result is fluid being driven in a direction towards the most distant of the two reservoirs.

In one implementation, the inertial pump may comprise a bubble jet pump. A bubble jet pump is a pump that produces an initially expanding bubble to move or drive adjacent fluid away from the bubble. One example of a bubble jet pump comprises a micro-heater, such as a thermal inkjet (TIJ) pump. A TIJ pump utilizes one or more electrical resistors through which electric current is passed. The heat produced by the one or more resistors as electric current passes through the one or more resistors vaporizes fluid that is proximate to the resistors to create a bubble. As this bubble is initially created and expands, the bubble initially drives adjacent fluid away from the bubble.

In one implementation in which one of fluid interaction components 246, 240 comprises a pump, flow sensor 22 and the pump are operated in an asynchronous manner. In other words, the flow of fluid through microfluidic channel 24 is sensed and estimated at times when the pump forming one of fluid interaction components 246, 248 is not currently pumping fluid. For example, in implementations where the fluid interaction component 246, 248 comprises a thermal inkjet resistor which is fired to create a vapor bubble to ultimately pump fluid, the transmission of electric current across heat emitting resistor 30 in the sensing of its electoral parameters to determine fluid flow is performed outside of the time during which the thermal inkjet resistor is fired. In one implementation in which the electric current is supplied to heat emitting resistor 30 in the form of alternating current or time spaced electrical pulses, such time-spaced electrical pulses constituting the operation frequency are asynchronous with the timing at which the pump is actuated, the pump firing rate. In one implementation, the measurement frequency or frequency at which the electrical parameter of heat emitting resistor 30 is measured and the resulting flow rate estimation occurs at least twice the frequency at which the pump forming fluid interaction component 246, 248 is fired to facilitate reference measurement during near zero flow and second near-peak pump flow. In other implementations, the center the pump may be activated concurrently or simultaneously.

In one implementation, the output of electronics 34, indicating a current rate of fluid flow within microfluidic channel 24, is utilized by a controller 251 to control or vary the operation of one or more of fluid interaction components 246, 248. For example, in one implementation, the signals output by electronics 34 indicating the flow of fluid within microfluidic channel 24 are utilized by controller 251 to control the timing of the operation of a pump which moves fluid through microfluidic channel 24. As a result, system 220 facilitates a closed-loop feedback system with respect to the pumping or movement of fluid through microfluidic channel 24 at a desired rate. In other implementations, controller 251 may utilize signals from electronics 34, indicating fluid flow rate, to control microfluidic valves, drop ejectors, microfluidic mixers and the like.

Figure 4:
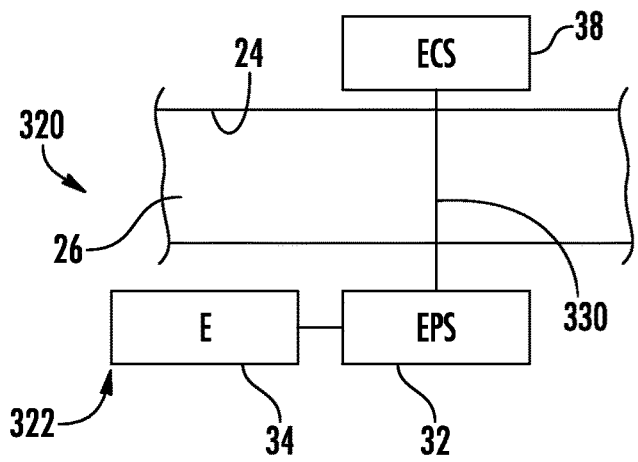
FIG. 4 is a top view schematically illustrating another example microfluidic flow sensing system.

FIG. 4 illustrates microfluidic flow sensing system 320, another example implementation of system 20. Microfluidic flow sensing system 320 is similar to system 20 except that system 320 is specifically illustrated as comprising flow sensor 322 which comprises heat emitting resistor 330 in place of heat emitting resistor 30. Those remaining elements or components of system 320 which correspond to elements or components of system 20 are numbered similarly.

Heat emitting resistor 330 comprises an elongated line of heat emitting electrically resistive material or materials that extends completely across microfluidic channel 24. Heat emitting resistor 330 has a high thermal coefficient of resistance (TCR), positive or negative, to deliver high response to temperature stimulus (1/Kelvin). In one implementation, heat emitting resistor 330 has a thermal coefficient of resistance (TCR), the relative change in resistance relative to temperature changes, of at least 1e-4 1/C. TCR for various materials for heat emitting resistor 330 are expressed by the formula $R=R(T\_0)=\exp[TCR(T-T\_0)]$, wherein TCR of Ta—Al is $-100$ ppm/C$=-1e-4$ 1/C; TCR of WSiN is $-450$ ppm/C$=-4.5e-4$ 1/C; and TCR of Al is $4e-3$ 1/C. In one implementation, heat emitting and heat sensing resistor 330 is made of platinum has a thermal coefficient of resistance of at least 0.0035-0.0039 1/K. In other implementations, heat sensing resistor 330 made of WSiN cermet has thermal coefficient of resistance of $-0.00045$ 1/K. A variety of other highly thermal sensitive material may be utilized for heat emitting and sensing element 330. Semi-conductor materials, due to their high negative TCR ($-0.07$ 1/K for Si) may also serve as a thermal sensitive element.

In one implementation, heat emitting resistor 330 comprises a trace or wire extending across ending contact with a floor of microfluidic channel 24. In one implementation, heat emitting resistor 330 is directly fabricated or deposited upon the substrate forming the floor of the microfluidic channel 24. In one implementation, heat emitting resistor 330 has a length to width ratio of at least 5 to 1. In one implementation, heat emitting resistor 330 comprise materials having a sheet resistance of between 10 and 1000 Ohm/square. In one implementation, heat emitting resistor 330 comprises at least one material including, but not limited to, aluminum, platinum, rhodium, copper, nickel, tantalum, tungsten, ruthenium, nickel chromium, copper nitride, silicon, polysilicon, germanium, carbon, graphite, graphene, tin oxide, zinc tin oxide, tantalum nitride, titanium nitride, manganese oxide, ruthenium oxide, vanadium oxide, and tungsten-silicon-nitride (WSixNy).

Figure 5:
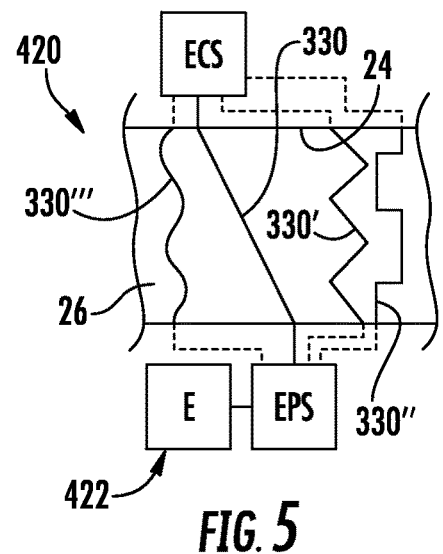
FIG. 5 is a top view schematically illustrating another example microfluidic flow sensing system.

FIG. 5 illustrates microfluidic flow sensing system 420, another example implementation of microfluidic flow sensing system 20. System 420 is similar to system 320 except that heat emitting resistor 330 extends diagonally across microfluidic channel 24. Because heat emitting resistor 330 extends diagonally across microfluidic channel 24, heat emitting resistor 330 has a greater length within channel 24, increasing the amount of surface area in contact with the fluid flowing across resistor 330. The greater surface area facilitates greater temperature changes and corresponding greater resistance changes due to the greater amount of heat that may be taken away from resistor 334 a given flow rate due to the larger surface area of resistor 330 within channel 24.

FIG. 5 further illustrates other examples or configurations of heat emitting resistor 330 that may be used to lengthen the extent of heat emitting resistor 330 within channel 24 to further facilitate and enhance temperature sensing accuracy. For example, in lieu of having a heat emitting resistor extending perpendicularly across microfluidic channel 24, system 420 may comprise a heat emitting resistor 330' having a zigzag pattern, a heat emitting resistor 330" having a square wave pattern or a heat emitting resistor 330'" having a winding or wave pattern across channel 24.

Figure 6:
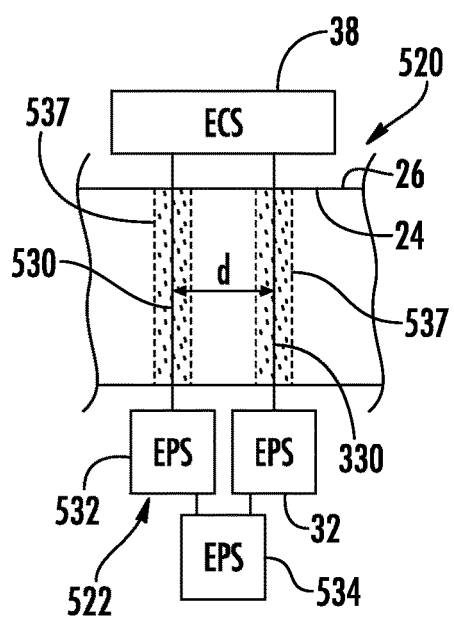
FIG. 6 is a top view schematically illustrating another example microfluidic flow sensing system.

FIG. 6 illustrates microfluidic flow sensing system 520, another example of microfluidic flow sensing system 20. Microfluidic flow sensing system 520 is similar to microfluidic flow sensing system 320 except that system 520 additionally comprises a second heat emitting resistor 530 and a second parameter sensor 532. System 520 additionally comprises electronics 534 in lieu of electronics 34 which estimate or determine fluid flow based upon signals based upon the electrical parameters of both heat emitting resistor 330, 530.

Heat emitting resistor 530 is similar to heat emitting resistor 330. As with heat emitting resistor 330 emitting resistor 530 is integrated into substrate 26, extends across microfluidic channel 24 and is electrically connected or coupled to its associated electrical parameter sensor 532. Heat emitting resistor 530 is spaced from heat emitting resistor 330 in a direction along a longitudinal length of microfluidic channel 24. In one implementation, emitting resistor 530 is spaced from sensing resistor 330 by a distance d of between 10 and 1000 μm and nominally 50-100 μm. As will be described hereafter, the additional emitting resistor 530 facilitates differential signals which indicate flow direction, in addition to flow magnitude. The distance between heating and sensing elements limited by thermal cross talk at short distances and slow sensor response at high distances.

In one implementation, heat emitting resistor 530 is thermally isolated or thermally insulated with respect to heat emitting resistor 330 such that heat transfer from one of resistors 330, 530 to the other of resistors 330, 530, other than through the carriage of heat by the flow of fluid, such as through or across the substrate 26 is reduced. In other words, solid-state heat conductance through substrate 26 is isolated from convection heat transfer through the flow of fluid. For example, in one implementation, portion the substrate 26 extending between and about resistors 330, 530 are formed from a material or a combination of materials having a lower degree of thermal conductivity as compared to the remaining materials of substrate 26. For example, in one implementation, portions of substrate 26 that otherwise would come into contact with resistors 330, 530 are covered, layered or coated with an oxide layer 537 (indicated by stippling). As a result, heat transfer through substrate 26 from one of resistors 330, 530 to the other resistors 330, 530 is reduced to facilitate greater sensing accuracy.

In another implementation, solid-state heat conductance through substrate 26 is isolated from convection heat transfer through the flow fluid by electrical current source 38 transmitting electric current across resistors 330, 530 in an alternating current pulsed manner mode. For example, in one implementation, the transmission of electric current across resistor 330, 530 is provided with time-space electrical pulses which are out of phase with respect to one another, whereby the sensing of the electrical parameter by sensors 32, 532 is also offset in time with respect to one another. In such implementations, the use of alternating current pulses further facilitates greater temperature differentials, producing greater resistance variations which allow the sensitivity of sensor 522 to be enhanced.

In one implementation, an electrical current pulse of 0.1 μs-10 ms is transmitted across transistors 330, 530 at a frequency of between 120 kHz and 10 Hz and nominally between 1 and 100 kHz. In one implementation, in which resistors 330, 530 are formed from WSiN, electrical current is supplied to each of the resistors at an amperage of between 0.1 mA and 50 mA and a frequency of between 48 kHz and 10 Hz. In one implementation, in which resistors 330, 530 are formed from Ta—Al alloy, electrical current is supplied to each of the resistors at an amperage of between 0.1 and 500 mA and a frequency of between 12 kHz and 1 Hz. In one implementation, in which resistors 330, 530 are formed from platinum, electrical current is supplied to each of the resistors at an amperage of between 0.1 mA and 50 mA and a frequency of between 0 and 15 kHz.

Electrical parameter sensor 532 is similar to electrical parameter sensor 32. Electrical parameter sensor 532 comprises electrical componentry electrically connected or electrically coupled to heat emitting resistor 530 so as to sense electrical parameter of heat emitting resistor 530 that is based on the resistance of the heat emitting resistor 530. In one implementation, the parameter may comprise a voltage across heat emitting resistor 530. In another implementation, the electrical parameter may comprise electrical current flow across heat emitting resistor 530. Examples of sensor 532 include, but are not limited to, a field effect transistor, a thermocouple, a bipolar junction transistor, or other P-N junction sensing devices. Electrical parameter sensor 532 outputs electrical signals based upon the sensed electrical parameter. Such electrical signals are used by electronics 534 to determine fluid flow within microfluidic channel 24 across heat emitting resistor 530.

Electronics 534 is similar to electronics 34 described above. Electronics 534 receives signals from each of electrical parameter sensors 32, 532. Based upon such signals, electronics 534 determines or estimates a magnitude of fluid flow across resistor 330, 530 within microfluidic channel 24. In addition, using signals from sensors 32, 532, electronics 534 is further operational in a mode in which the direction of fluid flow is detected. Through comparison of the signals received from sensors 32, 532 and their associated resistors 330, 530, electronics 534 determines the direction of flow within microfluidic channel 24.

Figure 7:
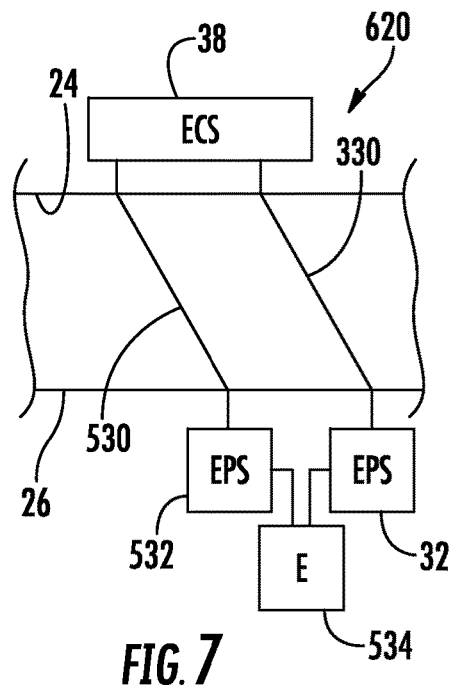
FIG. 7 is a top view schematically illustrating another example microfluidic flow sensing system.

FIG. 7 illustrates microfluidic flow sensing system 620, another example implementation of microfluidic flow sensing system 20. Microfluidic flow sensing system 620 is similar to microfluidic flow sensing system 520 except that heat emitting resistors 330, 530 extend diagonally across microfluidic channel 24 to increase the aspect ratio or surface area of resistors 330, 530 coming into thermal communication or thermal contact with the fluid flowing through microfluidic channel 24. Thermal communication or thermal contact means that fluid flowing through microfluidic channel 24 is sufficiently close to resistors 330, 530, through either direct contact or by being coupled by materials having relatively high levels of thermal conductivity, such that heat generated by resistors 330, 530 is drawn and carried away by such fluid flow and the rate at which the heat is drawn or carried away is responsive to the rate of fluid flow. As described above with respect to microfluidic flow sensing system 420, heat emitting resistors 330, 530 may extend across microfluidic channel 24 in other fashions, such as zigzag, wavy or square wave, to also increase and extent to which such resistors 330, 530 are in thermal communication with fluid flow within microfluidic channel 24.

Figure 8:
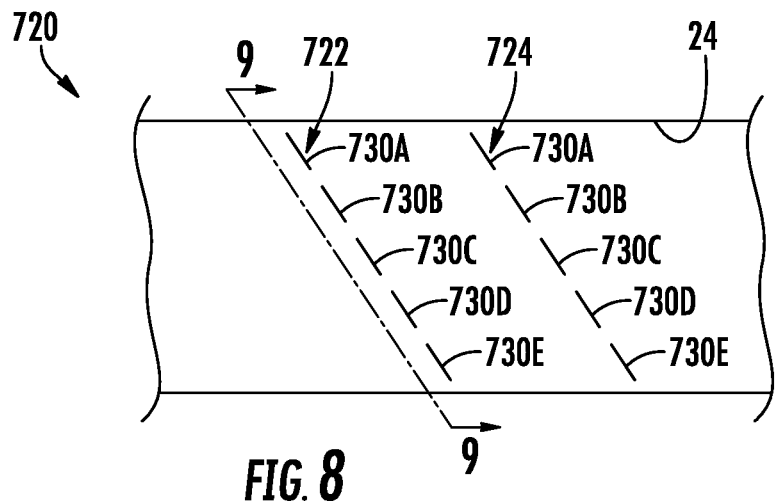
FIG. 8 is a top view schematically illustrating a portion of another example microfluidic flow sensing system.
Figure 9:
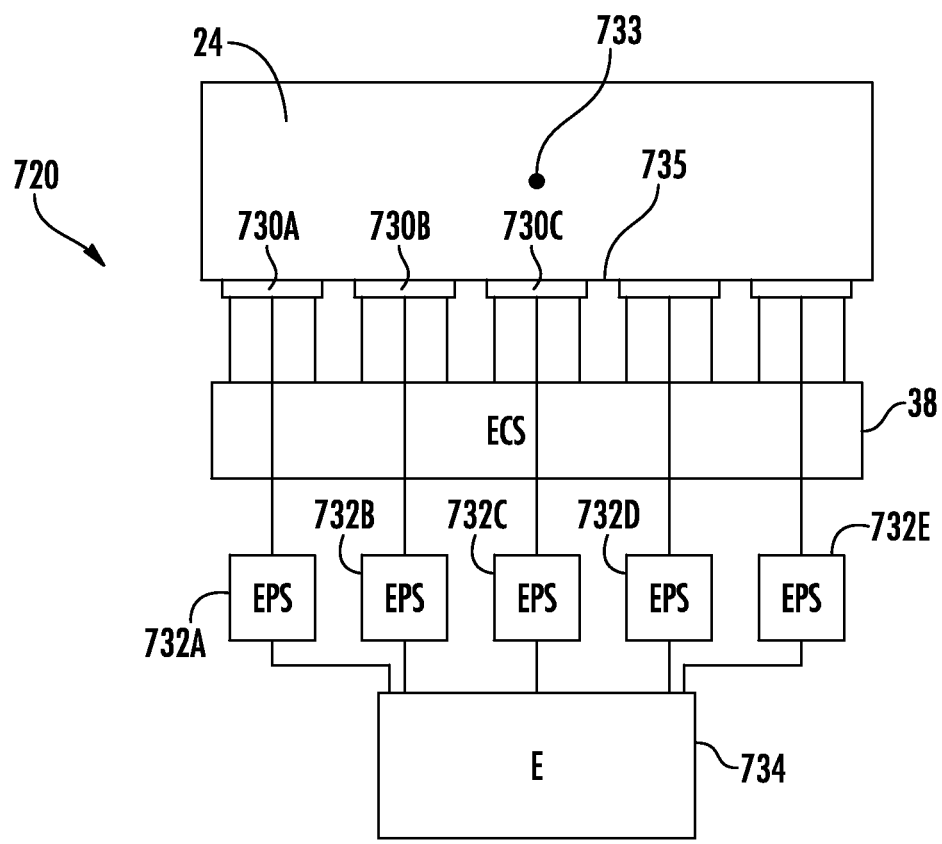
FIG. 9 is a sectional view of the microfluidic flow sensing system of FIG. 8 taken along line 9-9.

FIGS. 8 and 9 illustrate microfluidic flow sensing system 720, another example implementation of microfluidic flow sensing system 20. Microfluidic flow sensing system 720 is similar to microfluidic flow sensing system 620 except that microfluidic flow sensing system 720 replaces the pair of heat emitting resistors 330, 530 and their associated electrical parameter sensors 32, 532 with two series 722, 724 of heat emitting resistors, each of series 722, 724 comprising independent heat emitting resistors 730A, 730B, 730C, 730D and 730E (collectively referred to as heat emitting resistors 730) and associated electrical parameter sensors 732A, 732B, 732C, 732D and 732E. As shown by FIG. 8, heat emitting resistors 730 are arranged and spaced from one another end-to-end so as to diagonally extend across microfluidic channel 24. In other implementations, heat emitting resistors 730 may extend across channel 24 in other patterns, such as a pattern shown in FIG. 5.

FIG. 9 is a sectional view taken along line 9-9 of FIG. 8, wherein flow of fluid within channel 24 is into the drawing page as indicated by point 733. As shown by FIG. 9, each of resistors 730 is situated along the floor 735 of microfluidic channel 24 and is supplied with electrical current by electrical current source 38 (described above). As with heat emitting resistor 330, each of heat emitting resistor 730 produces and emits heat in response to electrical current flowing across heat emitting resistors 730. As with heat emitting resistor 330, the electrical resistance of each of heat emitting resistor 730 varies in response to temperature. Fluid flow across each of heat emitting resistors 730 carries away heat being produced to lower the temperature of the particular heat emitting resistor 730.

Electrical parameter sensors 732 are similar to electrical parameter sensor 32. Each of parameter sensors 732 comprises electrical componentry electrically connected or electrically coupled to an associated heat emitting resistor 730 so as to sense an electrical parameter of heat emitting resistor 730 that is based on the resistance of the heat emitting resistor 730. In one implementation, the parameter may comprise a voltage across heat emitting resistor 730. In another implementation, the electrical parameter may comprise electrical current flow across heat emitting resistor 730. Examples of sensors 732 include, but are not limited to, a field effect transistor, a thermocouple, a bipolar junction transistor, or other P-N junction sensing devices. Electrical parameter sensors 732 outputs electrical signals based upon the sensed electrical parameter. Such electrical signals are used by electronics 734 to determine fluid flow within microfluidic channel 24 across heat emitting resistors 730.

Electronics 734 is similar to electronics 534 and electronics 34. Electronics 734 receives signals from each of the electrical parameter sensors 732 of each of series 722 and 724. Based upon such signals, electronics 734 determines a direction of fluid flow by comparing signals from series 722 and 724. Based upon a comparison of the signals from the different electrical parameter sensors 732 of each series 722 and 724, based upon varying characteristics or parameters of heat emitting resistors 730 of each of series 722 and 724, electronics 734 estimates or determines differences in fluid flow across the width of microfluidic channel 24.

Figure 10:
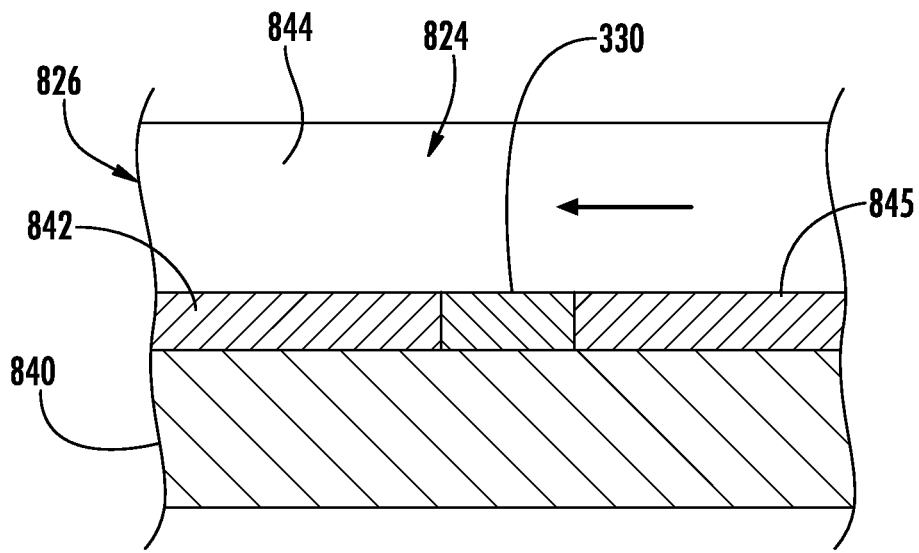
FIG. 10 is a sectional view of an example microfluidic channel and heat emitting resistor of an example microfluidic flow sensing system.
Figure 11:
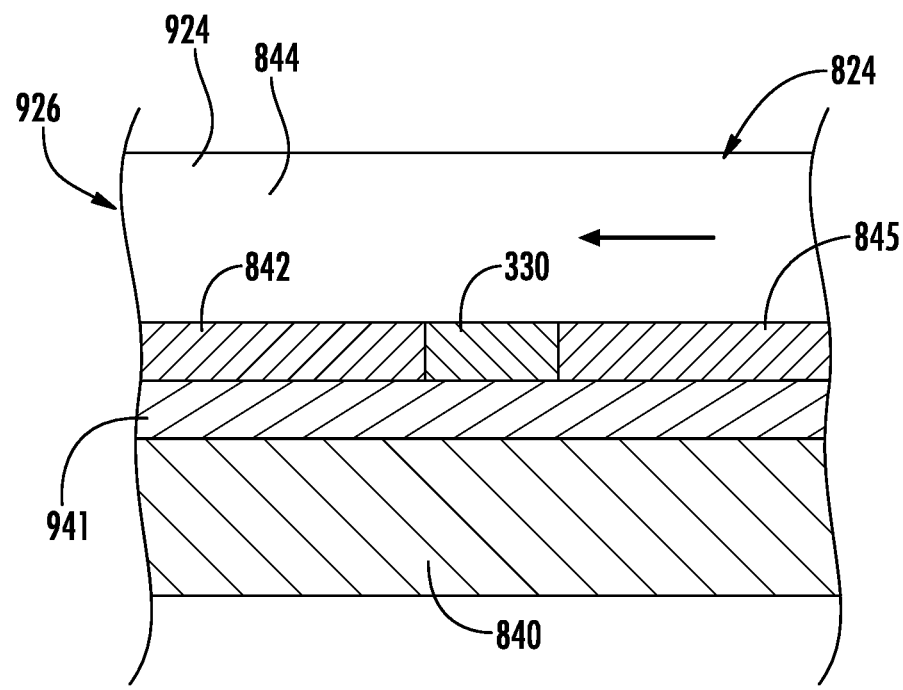
FIG. 11 is a sectional view of another example microfluidic channel and heat emitting resistor of an example microfluidic flow sensing system.

FIGS. 10 and 11 illustrate two examples of thermal isolation or thermal insulation of a heat emitting resistor along the floor of microfluidic channel 24. FIG. 10 illustrates a microfluidic channel 824 formed or integrated in a substrate 826 and supporting an example heat emitting resistor 330. Substrate 826 comprises a base substrate layer 840 and a thermal insulation layer 842. Base substrate layer 840 underlies layer 842 and heat emitting resistor 330. In one implementation, base layer 840 further formed the sides 844 of microfluidic channel 824. In one implementation, base substrate layer 840 is formed from silicon.

Thermal insulation layer 842 comprises a layer material formed upon top of base layer 840 within microfluidic channel 824. Thermal insulation layer 842 has a thermal conductivity less than that of the material or materials of base layer 840. Thermal insulation layer 842 had a thermal conductivity less than that of heat emitting resistor 330. Thermal insulation layer 842 extends an opposite sides of heat emitting resistor 330 and, together with heat emitting resistor 330, form a floor 845 of channel 824. In one implementation, thermal insulation layer 842 comprises an oxide layer, such as an oxide of the material forming base substrate layer 840. Thermal insulation layer 842 reduces the thermal conduction of heat produced by heat emitting resistor 330 to nearby heat emitting resistors, such as heat emitting resistor 530 shown in FIG. 7.

FIG. 11 illustrates a microfluidic channel 924 formed or integrated in a substrate 926 and supporting an example heat emitting resistor 330. Substrate 926 comprises a base substrate layer 840, an intermediate thermal insulation layer 941 and a thermal insulation layer 842. Base substrate layer 840 underlies layers 941, 842 and heat emitting resistor 330. In one implementation, base layer 840 further forms the sides 844 of microfluidic channel 824. In one implementation, base substrate layer 840 is formed from silicon.

Intermediate thermal insulation layer 941 extends on top of base substrate layer 840. Thermal insulation layer 941 has a thermal diffusivity (thermal conductivity/heat capacitance ($cm^2/s$)) less than that of the fluid to be circulated within channel 24. In one implementation, thermal insulation layer 941 has a thermal diffusivity less than that of the material or materials of base layer 840. Thermal insulation layer 941 has a thermal conductivity and a thermal diffusivity less than that of heat emitting resistor 330. Thermal insulation layer 941 extends beneath heat emitting resistor 330. In one implementation, thermal insulation layer 941 comprises an oxide layer, such as an oxide of the material forming base substrate layer 840. In one implementation, emitting resistor 330 are suspended as part of a bridge, wherein susceptible thermal losses may be restricted to electrical terminals.

Thermal insulation layer 842 is similar to thermal insulation layer 842 of substrate 826. Thermal insulation layer 842 and substrate 926 comprises a layer material formed upon on intermediate thermal insulation layer 941 within microfluidic channel 924. Thermal insulation layer 842 has a thermal conductivity less than that of the liquid or fluid to be certain within channel 24. In one implementation, thermal insulation layer 842 has a thermal conductivity less than that of the material or materials of base layer 840. Thermal insulation layer 842 has a thermal conductivity less than that of heat emitting resistor 330. Thermal insulation layer 842 extends an opposite sides of heat emitting resistor 330. In one implementation, thermal insulation layer 842 comprises an oxide layer, such as an oxide of the material forming base substrate layer 840. Thermal insulation layer 842 reduces the thermal conduction of heat produced by heat emitting resistor 330 to nearby heat emitting resistors, such as heat emitting resistor 530 shown in FIG. 7.

In some implementations, the example substrates and heat emitting resistor shown in FIGS. 10 and 11 are employed in each of the microfluidic flow sensing systems described above, microfluidic flow sensing systems 20, 220, 320, 420, 520 and 720. Although not illustrated in FIGS. 4-9, in some implementations, each of microfluidic flow sensing systems 320, 420, 520, 620 and 720 additionally comprises the fluid interaction components 246, 248 described above with respect to FIG. 3 and microfluidic flow sensing system 220. Although each of the above-described microfluidic flow sensing systems is illustrated as including a single flow sensor along the microfluidic channel, in other implementations, multiple microfluidic flow sensors, such as described above, may be utilized to sense fluid flow within the microfluidic channel 24.

Although the present disclosure has been described with reference to example implementations, workers skilled in the art will recognize that changes may be made in form and detail without departing from the spirit and scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An apparatus comprising:
a microfluidic channel; and
a flow sensor along the microfluidic channel, the flow sensor comprising:
a heat emitting resistor for connection to an electric current source, the heat emitting resistor having a resistance that varies in response to temperature;
an electrical parameter sensor to sense an electrical parameter of the heat emitting resistor that is based on the resistance of the heat emitting resistor;
a second heat emitting resistor having a resistance that varies in response to temperature;
a second sensor to sense an electrical parameter of the second heat emitting resistor that is based on the resistance of the second heat emitting resistor; and
electronics that determine at least one flow based on the sensed electrical parameter of the heat emitting resistor and the sensed electrical parameter of the second heat emitting resistor.

2. The apparatus of claim 1 further comprising:
a substrate supporting the microfluidic channel and the flow sensor; and
a fluid interaction component supported by the substrate to interact with fluid directed by the microfluidic channel.

3. The apparatus of claim 2, when the fluid interaction component is selected from a group of fluid interaction components consisting of: a microfluidic branch channel stemming from the microfluidic channel; a microfluidic pump; a microfluidic valve; a microfluidic multi-mixer; a drop ejector; a thermal inkjet resistor; and a nozzle.

4. The apparatus of claim 1,
wherein the heat emitting resistor extends across the microfluidic channel in a path selected from a group of paths consisting of: diagonal, serpentine, wavy, zigzag, and square wave.

5. The apparatus of claim 1 further comprising:
a substrate underlying the heat emitting resistor; and
a thermal insulative layer between the substrate and the heat emitting resistor, the thermal insulative layer having a thermal conductivity of less than or equal to 1-2.5 W/m*° C.

6. The apparatus of claim 5 further comprising a second thermal insulative layer on opposite sides of the heat emitting resistor, wherein a top of the heat emitting resistor is exposed to fluid within the microfluidic channel, the second thermal insulative layer having a thermal conductivity of less than or equal to 0.3 W/m*° C.

7. The apparatus of claim 1 further comprising:
a substrate underlying the heat emitting resistor; and
a thermal insulative layer on opposite sides of the heat emitting resistor, wherein a top of the heat emitting resistor is exposed to fluid within the microfluidic channel, the thermal insulative layer having a thermal diffusivity less than a thermal diffusivity of the substrate.

8. The apparatus of claim 1, wherein the heat emitting resistor comprises at least one material selected from a group of materials consisting of: aluminum, platinum, rhodium, copper, nickel, tantalum, tungsten, ruthenium, nickel chromium, copper nitride, silicon, polysilicon, germanium, carbon, graphing, tin oxide, zinc tin oxide, tantalum nitride, titanium nitride, magnesium oxide, rubidium oxide, vanadium oxide, and tungsten-silicon-nitride ($WSi_xN_y$).

9. The apparatus of claim 1 comprising:
an array of spaced heat emitting resistors across a microfluidic channel, the array including the heat emitting resistor; and
sensors, each of the sensors to sense an electrical parameter of one of the heat emitting resistors that is based on the resistance of the heat emitting resistor.

10. The apparatus of claim 1, wherein the heat emitting resistor has a length-to-width ratio of at least 5 to 1.

11. The apparatus of claim 1, wherein the microfluidic channel extends along an axis along which the flow is directed and wherein the heat emitting resistor and the second heat emitting resistor extend across different portions of a width of the microfluidic channel perpendicular to the axis.

12. The apparatus of claim 11, wherein the heat emitting resistor and the second heat emitting resistor are spaced apart from one another, end-to-end across the width of the microfluidic channel.

13. The apparatus of claim 12, wherein the heat emitting resistor and the second heat emitting resistor extend along a line oblique to the axis.

14. The apparatus of claim 13, further comprising a third heat emitting resistor spaced end-to-end from the second heat emitting resistor along the line oblique to the axis.

15. The apparatus of claim 13, further comprising:
a substrate underlying the heat emitting resistor; and
a thermal insulative layer between the substrate in the heat emitting resistor, the thermal insulative layer having a thermal conductivity of less than or equal to 1-2.5 W/m*° C.

16. The apparatus of claim 15 further comprising a second thermal insulative layer on opposite sides of the heat emitting resistor, wherein a top of the heat emitting resistor is exposed to fluid within the microfluidic channel, the second thermal incident layer having a thermal conductivity of less than or equal to 0.3 W/m*° C.

17. The apparatus of claim 12 further comprising:
a substrate underlying the heat emitting resistor; and
a thermal insulative layer on opposite sides of the heat emitting resistor, wherein a top of the heat emitting resistor is exposed to fluid within the microfluidic channel, the thermal insulative layer having a thermal diffusivity less than a thermal diffusivity of the substrate.

18. The apparatus of claim 1 further comprising:
a third heat emitting resistor for connection to an electric current source; and
a third sensor to sense an electrical parameter of the third heat emitting resistor that is based upon resistance of the third heat emitting resistor, wherein the heat emitting resistor, the second heat emitting resistor and the third heat emitting resistor are spaced along an axis along which the flow is directed within the microfluidic channel.

19. The apparatus of claim 1 further comprising a third heat emitting resistor for connection to the electric current source, wherein the electronics determine a first flow along a first width portion of the microfluidic channel based on the sensed electrical parameter of the heat emitting resistor, wherein the electronics determine a second flow along a second width portion of the microfluidic channel based on the sensed electrical parameter of the second heat emitting resistor and wherein the electronics determine a direction of flow based upon the sensed electrical parameter of the third heat emitting resistor and one of the first heat emitting resistor and the second heat emitting resistor.

20. An apparatus comprising:
a microfluidic channel; and
a flow sensor along the microfluidic channel, the flow sensor comprising:
  a heat emitting resistor for connection to an electric current source, the heat emitting resistor having a resistance that varies in response to temperature;
  an electrical parameter sensor to sense an electrical parameter of the heat emitting resistor that is based on the resistance of the heat emitting resistor;
electronics that determine a flow based on the sensed electrical parameter;
electronic circuitry to transmit time-spaced electrical pulses across the heat emitting resistor; and
a pump, wherein the time-spaced electrical pulses are asynchronous with pumping by the pump.

21. The apparatus of claim 20, wherein the pump comprises a bubble jet pump.

* * * * *